Dec. 31, 1929.  A. R. SANBORN  1,741,165
CONTROLLER
Filed May 28, 1925   2 Sheets-Sheet 1
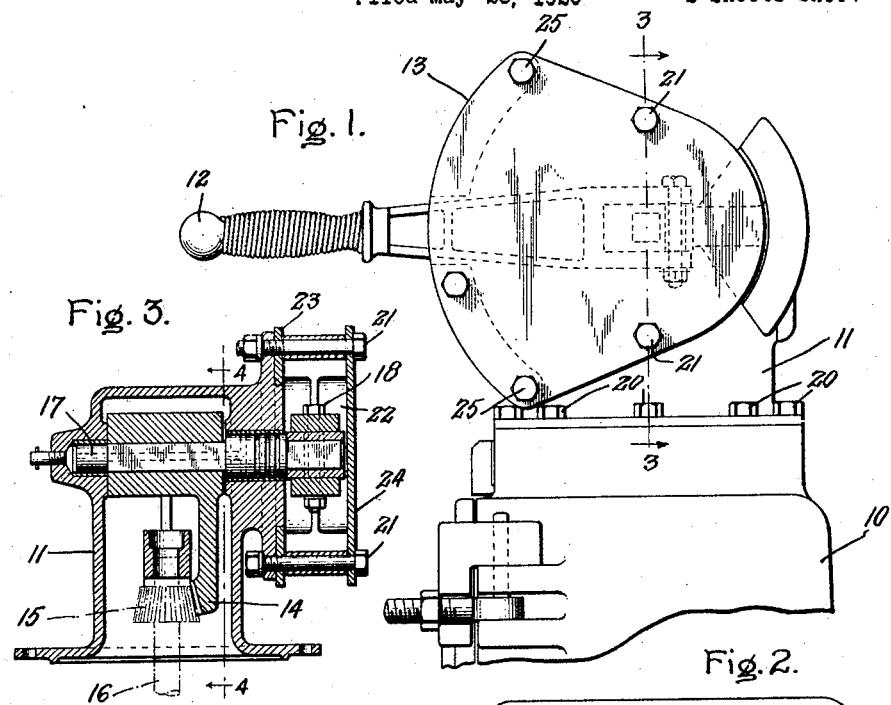
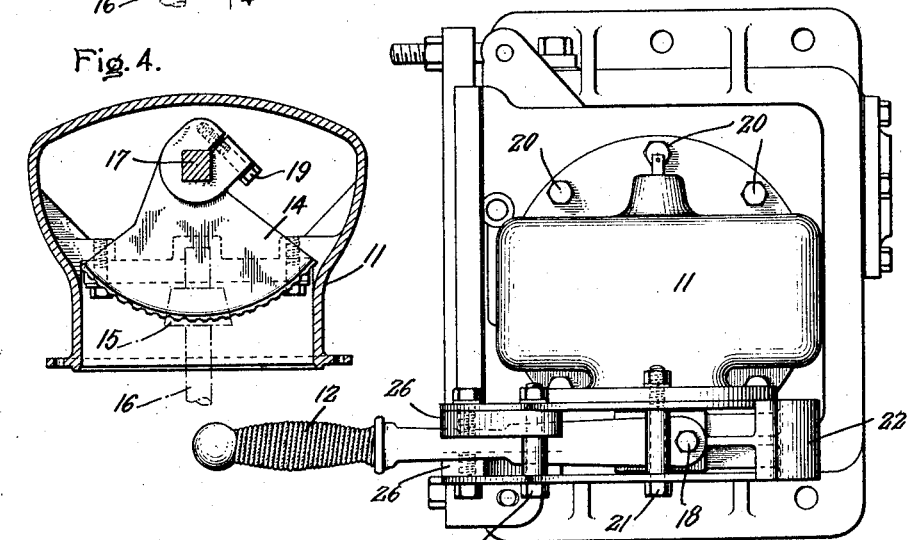
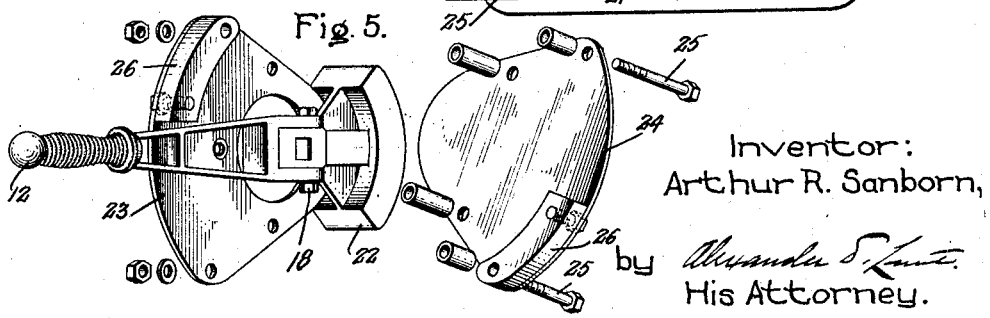
Inventor:
Arthur R. Sanborn,
by
His Attorney.

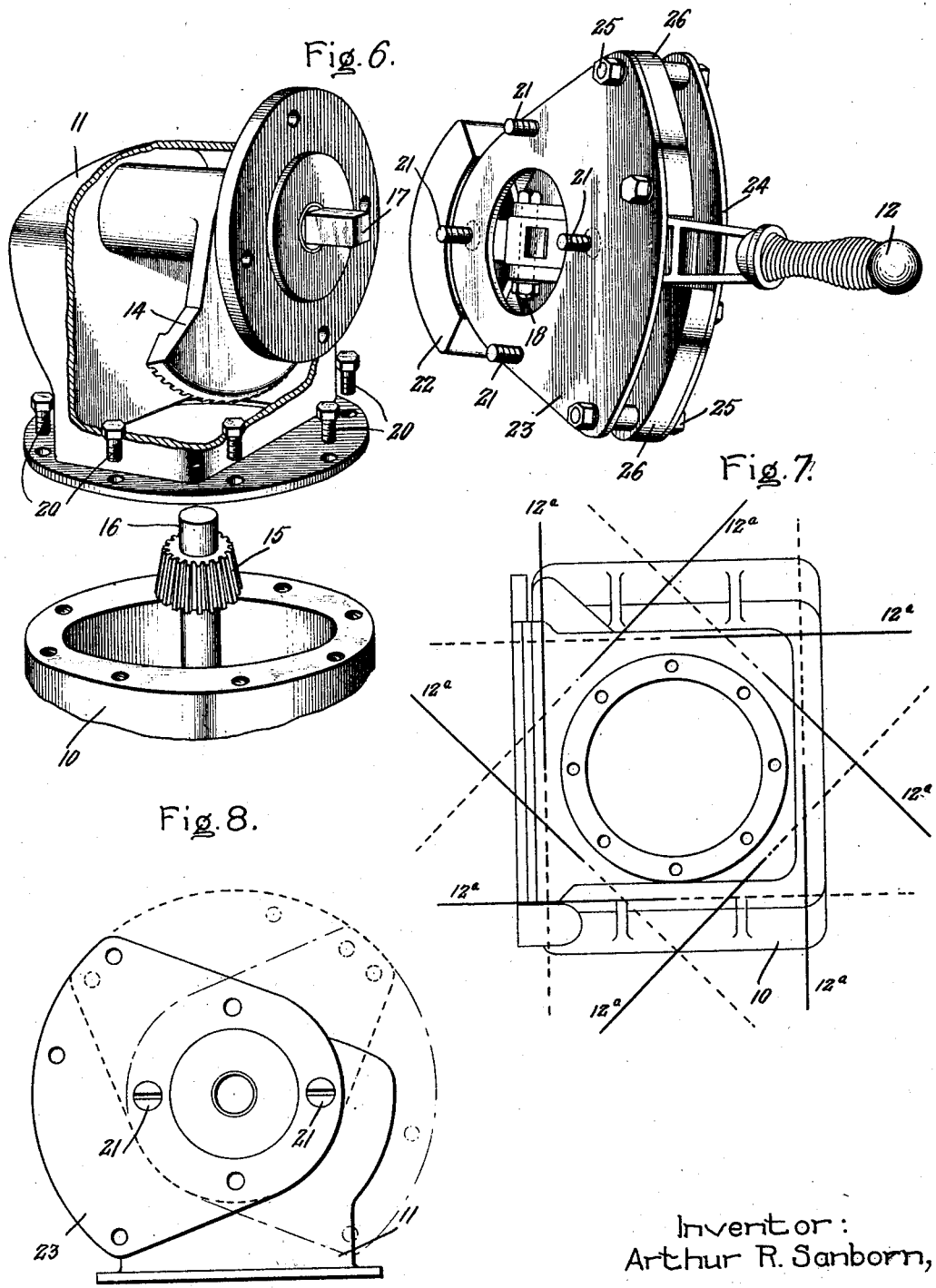

Patented Dec. 31, 1929

1,741,165

UNITED STATES PATENT OFFICE

ARTHUR R. SANBORN, OF EAST ORANGE, NEW JERSEY, ASSIGNOR TO GENERAL ELECTRIC COMPANY, A CORPORATION OF NEW YORK

CONTROLLER

Application filed May 28, 1925. Serial No. 33,567.

My invention relates to improvements in controllers, and in particular to improvements whereby the controller may be placed in any desired position and the controller handle adjusted so that regardless of the position in which the controller is placed, an operation of the handle in a given direction with respect to the head of the controller will always produce the same result under the control of the controller.

The invention is particularly applicable to the solution of problems in the convenient operation of controllers which are met with on ship board, for example. Space is ordinarily at such a premium on ship board and conditions are frequently such that an operator must manipulate a plurality of closely adjacent controllers, so that convenience of operation is important. Thus, assume that the conditions require that the controllers be placed head to head with the handles closely adjacent, it can readily be seen that two ordinary similar controllers so placed would require that the operator manipulate one handle in one direction to accelerate a motor controlled thereby and the handle of the other controller in the opposite direction to accelerate the motor controlled by this other controller. This is confusing to the operators and is apt to lead to accidents, and in any case, it is inconvenient since it is more comfortable to operate each controller handle like a pump handle, the same operation of each handle producing the same result. Another condition encountered is that in which the space or other requirements at one place necessitate that the controller be laid horizontal and the operator stand at the controller, either facing the controller, or facing to the right or to the left of the controller. With the ordinary controller, the movement of the handle is apt to be restricted by other apparatus and the movement of the handle is likely to be confusing since lifting the handle in one position will produce one operation of the controlled motor, whereas lifting the handle in another position will produce the opposite operation of the controlled motor. It is desirable that the same movement of the handle produce the same result for the sake of convenience and safety and also so that an operator in going from one controller to another need not figure out the proper operation of the controller to produce the result he intends.

In accordance with my invention, the above mentioned difficulties, and others which will be apparent to those skilled in the art, are obviated by means of an adjustable support for the operative connections between the controller handle and the controller switch mechanism, and an adjustable connection between the controller handle and the said support.

For a better understanding of the invention, reference is had to the accompanying drawings, in which Fig. 1 is a side elevation of a controller casing with an operating head and handle in accordance with the invention, Fig. 2 is a top view of the arrangement of Fig. 1, Fig. 3 is a cross section of the operating head on the line 3—3 of Fig. 1, Fig. 4 is a cross section of the operating head on the line 4—4 of Fig. 3, Fig. 5 is an exploded view of the controller handle and shroud, Fig. 6 is an exploded view of the controller, the operating head and the controller handle with shroud, Fig. 7 is a top view of the controller casing diagrammatically indicating the various positions of the controller handle which are obtainable by an adjustment of the operating head with reference to the casing and the shaft of the controller, and Fig. 8 is an end view of the operating head with the controller handle and a portion of the shroud removed for the purpose of indicating the various positions of the handle obtainable by adjusting the handle and shroud with reference to the operating head.

Referring to the drawing, the controller casing 10 having the switch contact mechanism (not shown) therein is provided with an adjustable operating head 11 and a handle 12 which is mounted for movement within a shroud 13. The operating head constitutes an adjustable support for the connections between the handle 12 and the controller switch mechanism. The operating head is provided with a bevel gear section 14 which is arranged to cooperate with the pinion 15 on the controller shaft 16. This gear sector 14 is mounted on the short shaft 17 so as to be readily removable therefrom. The handle 12 is also mounted on the shaft 17, so as to be readily removable therefrom. As is clearly shown in Figs. 1, 3, 5 and 6, the handle is secured in position on the squared end of the shaft 17 and the bolt 18 provides a pivotal mounting for the handle. The gear sector 14 is readily removable from the shaft 17 after the handle 12 and the shroud 13 have been removed from the end of the shaft 17 and the operating head has been removed from the controller casing by loosening the bolt 19 and removing the shaft 17 to the right (Fig. 3). The gear sector may then be reversed in in its position on the shaft 17 so as to make a diametrically opposite engagement with the pinion 15.

The operating head 11 is secured to the controller casing 10 by means of bolts 20, and it will be seen from Figs. 6 and 7 in particular that these bolts are symmetrically disposed about the controller shaft 16 so that the operating head with the controller handle may be moved as a unit to any one of a number of definite positions about the controller shaft, the number of positions being determined by the number of securing bolts. In Fig. 7 this feature of the invention is shown diagrammatically and the full lines 12ª indicate the various positions of the controller handle 12 which are obtainable by shifting the operating head with reference to the controller casing and the controller shaft. It will be seen that there are eight different positions for the controller handle obtainable in this manner, since there are eight symmetrically disposed bolt and bolt holes for screwing the operating head to the controller casing.

It will also be observed from an inspection of Fig. 7 that the dotted line extensions of the controller handle positions indicate that the controller handle is adjustable to an additional similar number of positions by reversing the position of the controller handle and shroud with reference to the operating head. By reference to Figs. 1, 6 and 8 particularly, it will be observed that the assembly of the controller handle and shroud is adjustable with reference to the operating head 11 by means of the bolts 21 which are symmetrically disposed about the shaft 17 through which the gear sector 14 is operated by means of the handle 12. By reference to Fig. 8 in particular, it will be observed that there are three different positions for the controller handle and shroud which are obtainable by adjusting the handle and shroud about the shaft 17. The full line position indicates one position. The dotted lines indicate the second position and the dot and dash lines indicate the third position.

The assembly of the controller handle and shroud will be readily understood from a consideration of Figs. 5 and 6. The controller handle is provided with a counter balance 22 which extends beyond the shroud, and the shroud is composed of two face plates 23 and 24 which are suitably secured to each other by means of the bolts 25. Each face plate is provided with a sector 26, and these sectors are provided for arresting the controller handle at the neutral position and making it necessary that the operator consciously shift past the neutral position in order to operate the handle past the neutral position. The bolt 18 provides a pivotal support for the handle so as to permit this shifting of the handle with reference to the shaft 17.

As thus constructed and arranged, the operation of my invention is as follows: It will be observed that by reason of the fact that the entire operating head may be shifted to any one of a plurality of definite positions as indicated diagrammatically in Fig. 7 and from the fact that the controller handle with shroud is adjustable to any one of three different operative positions with respect to the operating head, the operating handle is capable of adjustment to the multiple of the positions obtained by shifting the operating head and the positions obtained by shifting the shroud with the operating handle. Thus the controller handle may be adjusted accurately to accommodate the same for all of the various positions in which the controller is likely to be placed, either with reference to other apparatus which might likely interfere with the operation of the controller handle, with reference to another closely adjacent controller so that the operator could work both controller handles like pump handles, the same operation of each handle producing the same resulting effect of the particular controller, or the controller handle is adjustable so that regardless of whether the operator must stand facing the controller, to the side of the controller, or with his back to the controller, the operation of this particular controller will correspond with the operation of other similar controllers located on shipboard, for example.

By reference to Figs. 3 and 4, it will be seen that when the operating head 11 is shifted to the diametrically opposite position in which the controller handle is on the left hand side of the controller (Fig. 3), the controller handle adjusted to point in the same direction to that indicated in Fig. 3, that it will be necessary to reverse the position of the gear sector 14 on the shaft 17. This may readily be done, as previously explained, when the controller handle and shroud are removed from the operating head, by simply withdrawing the shaft 17, reversing the position of the gear sector 14 on the shaft 17 and replacing the controller handle and shroud in their desired positions on the operating head.

What I claim as new and desire to secure by Letters Patent of the United States, is,—

1. In combination, an electric controller having a shaft and switch contact mechanism operated thereby, a handle, operative connections between the said handle and shaft, and a removable operating head for supporting the said handle and enclosing said operative connections, the said handle being arranged for mounting in any selected one of a plurality of operating positions on said operating head and the said operating head being arranged for mounting on said controller in any selected one of a plurality of angular positions about said shaft.

2. In combination, an electric controller having a shaft and switch contact mechanism operated thereby, a handle, reversible operative connections between the said shaft and handle, and a removable operating head for pivotally supporting the said handle for operating in a plane parallel to the axis of said shaft and for enclosing said operative connections, the said operating head being arranged for mounting on said controller in any selected one of a plurality of angular positions about the said shaft, and the said handle being arranged for mounting in any selected one of a plurality of operative positions on said operating head.

3. In combination, an electric controller having a shaft and switch contact mechanism operated thereby, a bevel pinion on said shaft, operating means for said shaft comprising a bevel gear sector arranged to be mounted in either of two meshing relations with said pinion and a handle for operating the said gear, and a support for the said operating means arranged for adjustment of the bevel gear sector into each of a plurality of angular positions about the said shaft and adjustment of the position of said handle with reference to said gear with the said bevel gear sector in either of said meshing relations with said pinion.

4. In combination, a controller having a casing, an operating shaft within the casing, an operating head for the controller comprising a rotatable handle and operative connections between the handle and said shaft, and a plurality of similar devices for securing the said head to said casing, the said devices being symmetrically disposed about the said shaft, whereby the said handle is adjustable about the said shaft to the number of different definite positions determined by the number of said adjusting devices.

5. In combination, a controller having a casing, an operating shaft within the casing, an operating head for the controller comprising a rotatable handle and operative connections between the handle and said shaft, a plurality of similar devices for securing said head to said casing, the said devices being symmetrically disposed about the said shaft, and an adjustable connection between the said handle and said head, whereby the said handle is adjustable in one plane to a number of definite positions about said shaft determined by the number of said securing devices and adjustable in another plane in each of said definite positions by adjusting the position of the handle with respect to the head.

In witness whereof, I have hereunto set my hand this 25th day of May, 1925.

ARTHUR R. SANBORN.